US012179660B1

(12) United States Patent
Park et al.

(10) Patent No.: US 12,179,660 B1
(45) Date of Patent: Dec. 31, 2024

(54) VEHICLE INTERIOR LIGHTING SYSTEM

(71) Applicants: HYUNDAI MOTOR COMPANY, Seoul (KR); KIA CORPORATION, Seoul (KR); LS AUTOMOTIVE TECHNOLOGIES CO., LTD., Anyang-si (KR); IL HEUNG CO., LTD., Pocheon-si (KR)

(72) Inventors: Sung Ho Park, Seoul (KR); Ju Whan Moon, Hwaseong-si (KR); Kyeong Sik Kim, Yongin-si (KR); Choon Woo Park, Seoul (KR); Ki Bong Lee, Yongin-si (KR)

(73) Assignees: HYUNDAI MOTOR COMPANY, Seoul (KR); KIA CORPORATION, Seoul (KR); LS AUTOMOTIVE TECHNOLOGIES CO., LTD., Anyang-si (KR); IL HEUNG CO., LTD., Pocheon-si (KR)

( * ) Notice: Subject to any disclaimer, the term of this patent is extended or adjusted under 35 U.S.C. 154(b) by 0 days.

(21) Appl. No.: 18/514,656

(22) Filed: Nov. 20, 2023

(30) Foreign Application Priority Data

Aug. 17, 2023 (KR) .................. 10-2023-0107346

(51) Int. Cl.
*B60Q 3/00* (2017.01)
*B60N 2/00* (2006.01)
*B60Q 3/16* (2017.01)
*B60Q 3/70* (2017.01)

(52) U.S. Cl.
CPC ............. *B60Q 3/16* (2017.02); *B60N 2/0027* (2023.08); *B60Q 3/70* (2017.02); *B60Q 2500/30* (2022.05)

(58) Field of Classification Search
CPC ........... B60Q 3/16; B60Q 3/70; B60N 2/0027
See application file for complete search history.

(56) References Cited

U.S. PATENT DOCUMENTS

| 11,565,625 | B2 | 1/2023 | Mizobata et al. |
| 2004/0007681 | A1* | 1/2004 | Moisel ..................... G01V 8/20 250/221 |
| 2020/0207264 | A1* | 7/2020 | Camras .................. H05B 47/11 |
| 2021/0245657 | A1 | 8/2021 | Mizobata et al. |
| 2021/0260229 | A1* | 8/2021 | Satou ........................ A61L 2/10 |
| 2022/0172489 | A1* | 6/2022 | Wieczorek ............. B60N 2/002 |
| 2023/0166651 | A1* | 6/2023 | Kim ..................... H05B 47/115 362/459 |

FOREIGN PATENT DOCUMENTS

JP 7446545 B2 * 3/2024
KR 20210101128 A 8/2021

* cited by examiner

*Primary Examiner* — Gerald J Sufleta, II
(74) *Attorney, Agent, or Firm* — Lempia Summerfield Katz LLC

(57) ABSTRACT

A vehicle lighting system in the interior of a vehicle adjusts the radiation area, the brightness, and the color temperature of light depending on the behavior, state, and posture of the passenger, so as to improve passenger convenience and upgrade interior lighting.

19 Claims, 14 Drawing Sheets

VEHICLE INTERIOR LIGHTING SYSTEM

CROSS-REFERENCE TO RELATED APPLICATION

This application claims priority to Korean Patent Application No. 10-2023-0107346, filed on Aug. 17, 2023 in the Korean Intellectual Property Office, the disclosure of which is incorporated herein by reference in its entirety.

BACKGROUND

1. Field of the Disclosure

The present disclosure relates to a vehicle interior lighting system. More particularly, the present disclosure relates to a vehicle interior lighting system, which provides light to the interior of a vehicle, detects information of a passenger, and adjusts aspects of light depending on the detected information.

2. Description of the Related Art

Interior lights are installed in a mobility vehicle, i.e., a vehicle, so as to illuminate the interior space of the vehicle. These interior lights are operated to illuminate the interior of the vehicle when a door is opened or depending on passenger manipulation. The lights are generally installed on the roof in the interior space of the vehicle.

Currently, autonomous driving of vehicles is being developed. In order to keep pace with the advancements in autonomous driving, the interior space of a vehicle is not limited to a driver's seat, a front passenger seat, and back seats, and instead, the positions of the seats can be changed to provide seating spaces to various positions.

For example, seats may be configured such that the positions of the seats in a vehicle are configurable to allow passengers to face each other or to sit in a circle in an autonomous driving situation. However, conventionally, the areas that interior lights illuminate within the interior of the vehicle have been limited or restricted. In other words, the interior lights are installed at the central part above the front seats and the central part above the back seats. Additionally, when the positions of the seats are changed, the positions to which the interior lights provide light are fixed. Thus, the light distribution angle of the interior lights may not be adjusted so as to fit a passenger's body type or taste. Therefore, when the position of the seat in which a passenger sits is moved, light from a corresponding interior light may be shielded by the passenger's body or may be radiated to an unnecessary position due to the light distribution of the interior light. Therefore, light may not be radiated to a position required by the passenger and may cause passenger inconvenience.

Further, when the light distribution angle of an interior light is excessively increased so as to radiate light to all positions of a seat, light may be unnecessarily radiated to other passengers.

The above information disclosed in the Background section is only to enhance understanding of the background of the disclosure. Therefore, the Background section may contain information that should not be interpreted as conventional technology that is already known to those having ordinary skill in the art.

SUMMARY

Therefore, the present disclosure has been made in view of the above problems. It is an object of the present disclosure to provide an interior lighting system, which provides light to the interior of a vehicle, based on the detected behavior, state, posture, and the like of a passenger. Additionally, the system adjusts the radiation area, brightness, and color temperature of light depending on the detected information. As a result, the system improves passenger convenience and upgrades the interior lighting of the vehicle.

In accordance with an aspect of the present disclosure, the above and other objects can be accomplished by the provision of an interior lighting system. The system includes a lighting unit having a plurality of light sources with differently set radiation areas and configured such that a brightness and a color temperature of light emitted by each of the light sources are adjusted to implement a dimming function. The system also includes an information collector configured to confirm state information of a vehicle and passenger information including a position and posture of a passenger in the vehicle. The system also includes a controller configured to control the lighting unit to adjust the brightness of light emitted so as to emit the light to the position of the passenger when information about the position of the passenger is input through the information collector. The controller is further configured to adjust the color temperature of the light emitted by the corresponding lighting unit when information about the posture of the passenger is input through the information collector.

The lighting unit may be provided in plural in an interior of the vehicle so as to set the radiation areas on respective seats.

The information collector may be configured to collect information about whether or not the passenger sits in the seats, positions of the seats, and reclining angles of the seats.

When information indicating that a position of one of the seats in which a passenger sits is adjusted in the forward or rearward direction is input through the information collector, the controller may be configured to control the lighting unit so as to emit light through the light sources having the radiation area corresponding to the adjusted position of the seat in which the passenger sits.

The controller may be configured to pre-store the color temperatures of the respective light sources depending on the reclining angle ranges of the seats. The controller may be configured to control the lighting unit so as to emit light having the color temperature corresponding to a reclining angle of one of the seats in which the passenger sits, when the reclining angle of the seat in which the passenger sits is input through the information collector.

The controller may be configured to control the lighting unit to decrease the color temperature of light so as to emit warm-toned light, when the reclining angle of the seat is increased. The controller may be configured to control the lighting unit to increase the color temperature of light so as to emit cool-toned light, when the reclining angle of the seat is decreased.

When a reclining angle of one of the seats in which a passenger sits is input through the information collector, the controller may be configured to control the lighting unit to gradually decrease the brightness of light when the reclining angle of the seat in which the passenger sits is increased. The controller may also be configured to control the lighting unit to gradually increase the brightness of light when the reclining angle of the seat in which the passenger sits is decreased.

When the seats are configured to be swiveled, the lighting unit may further include a swiveling light source configured to generate a radiation area on a corresponding one of swiveled seats.

The information collector may be configured to collect information about swiveled angles of the seats. The controller may also be configured to control the swiveling light source configured to generate the radiation area corresponding to a swiveled position of one of the seats in which the passenger sits, when information indicating that the position of the seat in which the passenger sits is swiveled is input through the information collector.

The lighting units may be provided in plural, and the lighting units having the radiation areas on some back seats other than frontmost seats S may further include the swiveling light source.

The information collector may be configured to collect information about an occurrence of failure when the seats are swiveled. The controller may be also configured to control the lighting unit to emit light so that a seat in which failure occurs is included in the radiation area of the lighting unit, when information about the seat in which the failure occurs is input through the information collector.

The controller may be configured to control the respective light sources of the lighting unit to be sequentially turned on in a direction of swiveling the seat.

The information collector may be further configured to confirm position information of the passenger outside the vehicle. The controller may be also configured to implement mood lighting through some of the plurality of light sources of the lighting unit, when information indicating that the passenger is sensed within a designated distance from the vehicle is input through the information collector.

The information collector may be further configured to confirm information about opening and closing of doors of the vehicle. The controller may be also configured to turn on the respective light sources of the lighting unit in a predetermined welcome mode, when information indicating that a door is opened is input through the information collector.

The information collector may be further configured to confirm eye position information of the passenger sitting in a seat of the vehicle. The controller may be also configured to control the respective light sources of the lighting unit so that passenger's eyes are not included in the radiation area of the lighting unit corresponding to the seat in which the passenger sits.

The controller may be also configured to receive eye position information of a driver sitting in a driver's seat among the seats. The controller may be configured to control the respective light sources of the lighting unit so that the driver's eyes are included in the radiation area of the lighting unit corresponding to the driver's seat, when a drowsy state of the driver is confirmed based on the eye position information of the driver.

The controller may be configured to control the lighting unit to increase the color temperature of light emitted by the lighting unit corresponding to the driver's seat so as to emit cool-toned light, when the drowsy state of the driver is confirmed.

The information collector may be further configured to confirm information about headrests of the seats of the vehicle. The controller may be configured to confirm again the eye position information of the passenger and then control the lighting unit so that the passenger's eyes are not included in the radiation area of the lighting unit corresponding to the seat in which the passenger sits, when information indicating that a position of the headrest of the seat in which the passenger sits is changed is input.

The information collector may be further configured to confirm information about a leg rest of a seat of the vehicle. The controller may be further configured to control the lighting unit to decrease the color temperature of light emitted by the lighting unit corresponding to the seat so as to emit warm-toned light and to decrease the brightness of the light, when the leg rest of the seat in which the passenger sits is unfolded.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION

Figure 1:
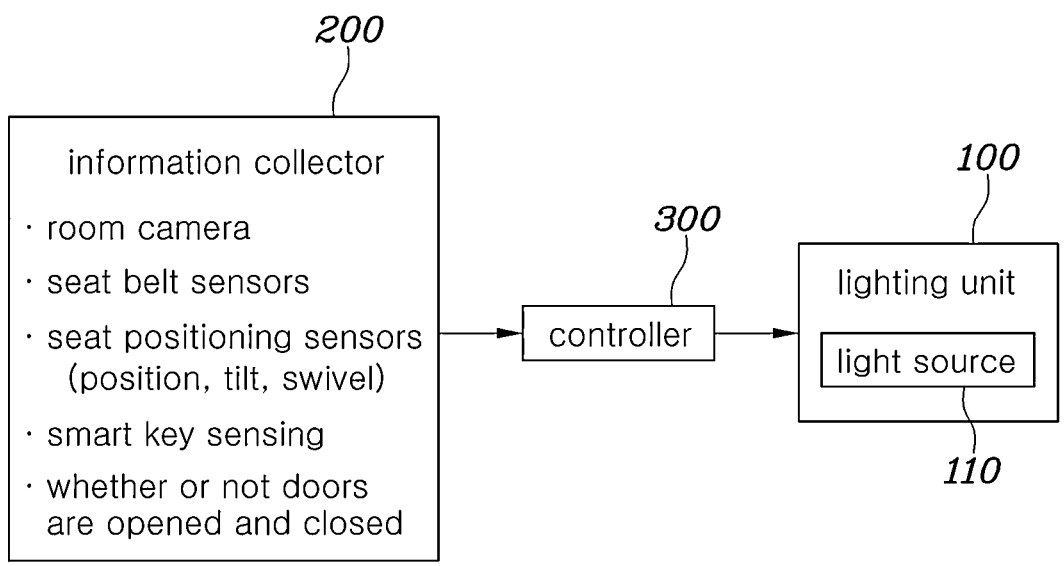
FIG. 1 is a block diagram of an interior lighting system according to the present disclosure.
Figure 2:
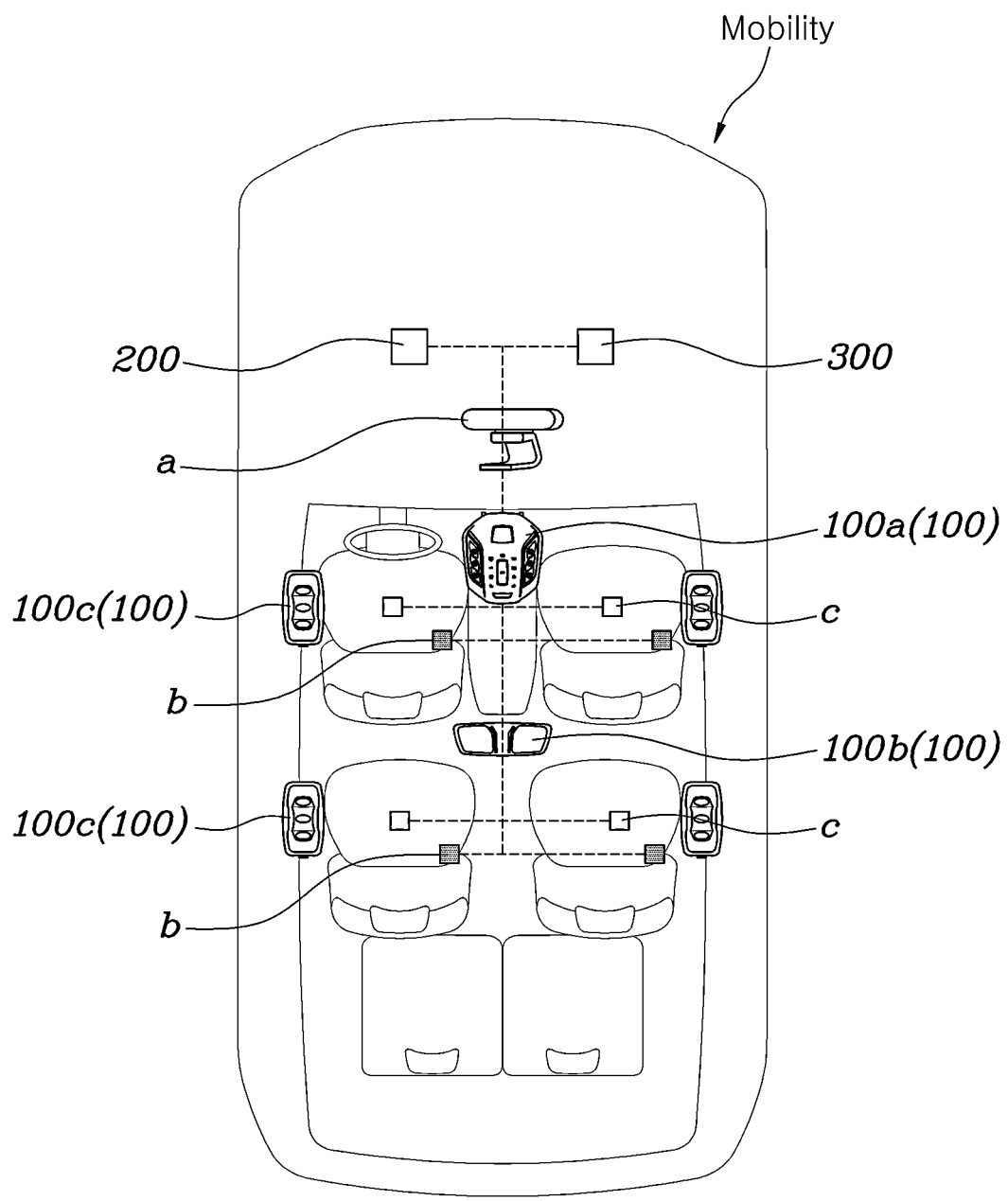
FIG. 2 is a view showing a vehicle having an interior lighting system according to one embodiment of the present disclosure.
Figure 3:
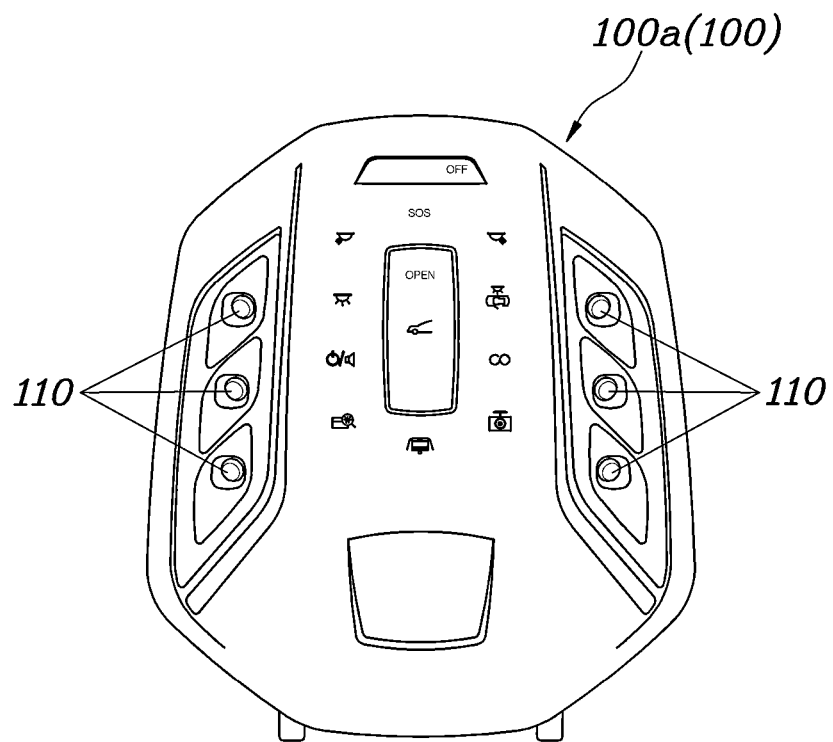
FIG. 3 is a view showing a first row central lighting unit among lighting units according to one embodiment of the present disclosure.

Reference is made in detail herein to embodiments of the present disclosure, examples of which are illustrated in the accompanying drawings. Wherever possible, the same reference numbers are used throughout the drawings to refer to the same or like parts.

In the following description of embodiments, suffixes, such as "module," "part," and "unit," are provided or used interchangeably merely for ease of description throughout the specification and do not have meanings or functions distinguished from one another.

In the following description of embodiments of the present disclosure, a detailed description of known functions and configurations incorporated herein has been omitted where the description may have made the subject matter of the present disclosure unclear. Further, the accompanying drawings are given to describe embodiments of the present disclosure and should not be construed as being limited to the embodiments set forth herein. Additionally, it should be understood that the embodiments of the present disclosure are provided only to completely disclose the technical concepts of the disclosure and cover modifications, equivalents, or alternatives, which come within the scope and technical range of the disclosure.

In the following description of embodiments, terms such as "first" and "second" are used only to describe various elements. These elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of embodiments, the terms "comprises," "comprising," "including," and "having," and variations thereof, are inclusive and therefore specify the presence of stated features, integers, steps, operations, elements, components, and/or combinations thereof. However, the terms do not preclude the presence or addition of one or more other features, integers, steps, operations, elements, components, and/or combinations thereof.

A controller may include a communication device configured to communicate with other controllers or sensors so as to control functions served by the controller. The controller may also include a memory configured to store operating systems or logic commands and input and output information. The controller may also include at least one processor configured to perform determination, calculation, decision, and the like required to control the functions served by the controller.

When a component, device, element, or the like of the present disclosure is described as having a purpose or performing an operation, function, or the like, the component, device, or element should be considered herein as being "configured to" meet that purpose or perform that operation or function.

Hereinafter, a vehicle interior lighting system (e.g., an interior lighting system) according to an embodiment of the present disclosure is described with reference to the accompanying drawings.

The interior lighting system according to the present disclosure includes one or more lighting units 100, each having a plurality of light sources 110. The light sources 110 have differently set radiation or illumination areas or directions and are configured such that a brightness and a color temperature of light emitted by each of the light sources 110 may be adjusted to implement a dimming function. The interior lighting system also includes an information collector 200 configured to confirm the state information of a vehicle and to confirm passenger information. The passenger information includes the position and the posture of a passenger in the vehicle. The interior lighting system also includes a controller 300 configured to control the one or more lighting units 100 to adjust the brightness of light emitted by each lighting unit of the lighting units 100 so as to emit the light to the position of the passenger when information about the position of the passenger is input through the information collector 200. The controller 300 is also configured to adjust the color temperature of the light emitted by each lighting unit of the lighting units 100 when information about the posture of the passenger is input through the information collector 200, as shown in FIG. 1.

The interior lighting system according to the present disclosure includes the one or more lighting units 100, the information collector 200, and the controller 300. The controller 300 is configured to determine the brightness, the color temperature, and the radiation area of light based on a pre-stored database depending on the passenger information input through the information collector 200. The lighting units 100 receive a command determined by the controller 300 and are configured to form the radiation areas through light emission from the light sources 110.

The one or more lighting units 100 according to the present disclosure may be installed on the roof in the interior of the vehicle. Each of the lighting units 100 includes a plurality of the light sources 110. The one or more lighting units 100 may be provided in plural, i.e., multiple lighting units 100 may be installed at various positions in the interior of the vehicle so as to set the radiation areas on respective seats S. In other words, multiple lighting units 100 may be provided so as to set the radiation areas on the respective seats S. The lighting units 100 may thus respectively provide light through control of the light sources 110 so as to fit or accommodate the postures and states of passengers sitting in the respective seats S. For example, as shown in FIGS. 2-5, in the present disclosure, a first row central lighting unit 100a, a second row central lighting unit 100b, and multiple subsidiary or side lighting units 100c, collectively the lighting units 100, may be provided. Each of the lighting units 100a, 100b, and 100c may include a plurality of light sources 110 so as to provide light having differently set brightness levels, color temperatures, and radiation areas to the respective seats S.

Further, the plurality of light sources 110 of the lighting units 100 may include LEDs. The light sources 110 may be configured such that the brightness and the color temperature of light emitted is adjustable. As a result, each of the light sources 110 may be adjustable and may have different radiation areas set depending on the installation positions and installation angles of the light sources 110. Additionally, the lighting units 100 may adjust or permit adjustment of the brightness and color temperature of light differently depending on the respective seats S. Thus, the lighting units may provide light optimized for the passengers depending on the postures, the states, and the like of the passengers sitting in the seats S.

The information collector 200 confirms passenger information, which includes the position and posture of a passenger in the vehicle. The information collector 200 may collect information through a plurality of sensors provided in the vehicle. The sensors may include a camera sensor a, seat belt sensors b, and seat positioning sensors c. Further, the information collector 200 may be configured to collect not only the posture of the passenger in the vehicle but also the state of the vehicle and information of a passenger outside the vehicle.

As such, the information collector 200 confirms the passenger information depending on whether or not the passenger sits in the seats S, the fore and aft positions of the seats S, the tilt or recline angles of the seats C, the rotation or swivel angles of the seats S, and/or the like.

The controller 300 controls the lighting units 100 to emit light to the passengers, when the passenger information is input through the information collector 200. In other words, the controller 300 may control the lighting units 100 based on the passenger information input from the information collector 200. Thus, the radiation area is generated on a seat S on which s passenger sits by control of the respective light sources 110 of a corresponding lighting unit 100. As a result, the light is optimized for the current e of the passenger by adjusting the brightness, the radiation area, and/or the color temperature of light.

As such, the interior lighting system according to the present disclosure provides light to the passenger in the interior of the vehicle. The system adjusts the radiation area, brightness, and color temperature of light depending on the behavior, state, and posture of the passenger. As a result, the interior lighting system improves passenger convenience and upgrades the interior lighting.

The present disclosure is described in more detail below. The information collector 200 may collect information about whether or not the passenger sits in the seats S, the positions of the seats S, and the reclining angles of the seats S.

The information collector 200 may receive the passenger information through the camera sensor a, the seat belt sensors b, and the seat positioning sensors c provided in the vehicle. The passenger information may include whether or not the passenger sits in the seats S, the positions of the seats S, and the reclining angles of the seats S.

In other words, the position of the radiation area and the brightness and color temperatures of light emitted by the corresponding lighting units 100 are determined depending on the position and posture of the passenger. The information collector 200 detects a seat S in which a passenger sits and provides information about the position and reclining angle of the corresponding seat S to the controller 300.

When information indicating that the position of the seat S in which the passenger sits is adjusted in the forward or rearward direction is input through the information collector 200, the controller 300 controls the appropriate lighting unit 100 having the radiation area corresponding to the adjusted position of the seat S so as to emit light through the light sources 110.

In other words, the controller 300 receives information about the seat S in which the passenger sits and the forward or rearward position of the seat S depending on a passenger request. The controller 300 then controls one or more of the lighting units 100 so as to generate light at the radiation area on the corresponding seat S. The controller 300 transmits a control command to the respective light sources 110 of the corresponding lighting unit 100 based on a pre-stored database to control the light sources 110 depending on the position of the seats S. The corresponding lighting unit 100 may then emit light by turning on the respective light sources 110 based on the received control command. The controller 300 may increase the color temperature of light emitted from the respective light sources 110 of the corresponding lighting unit 100 so that warm-toned light is emitted to secure visibility.

Figure 6:
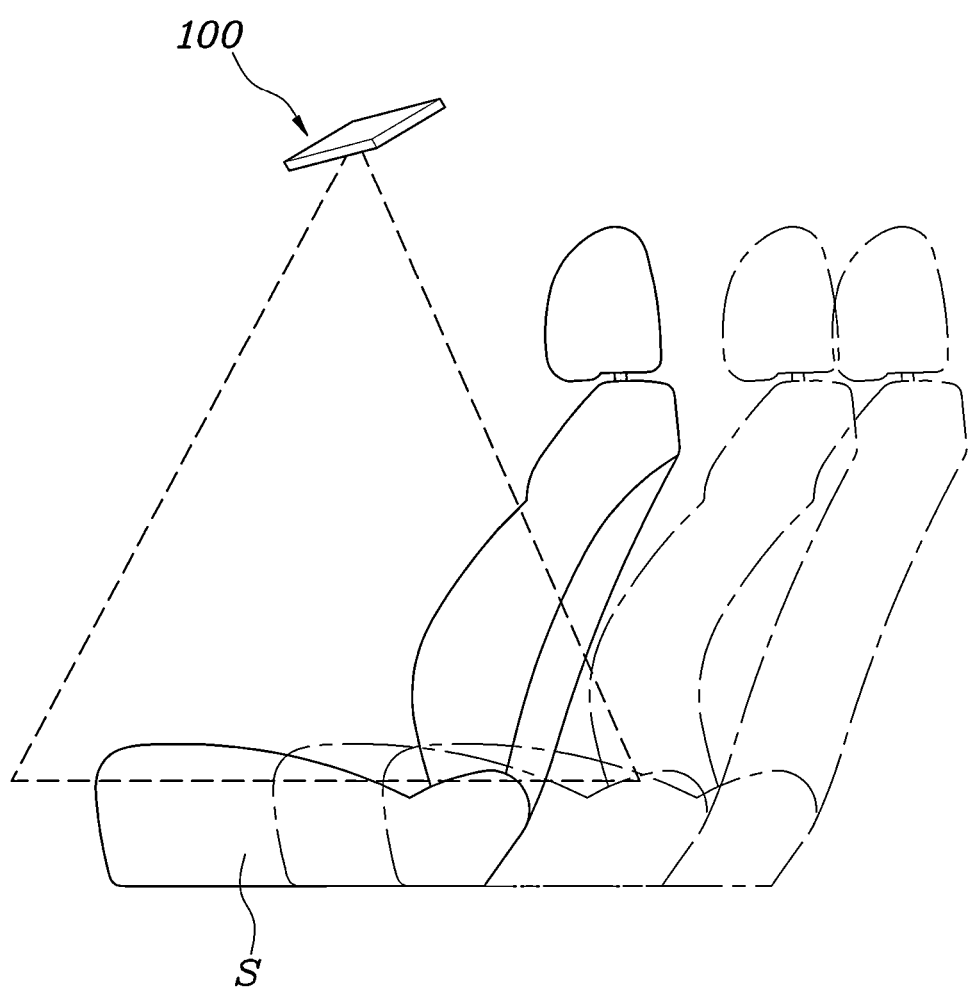
FIG. 6 is a view showing a radiation area in a state in which a seat is moved forward.

For example, when the seat S in which the passenger sits is moved forward, as shown in FIG. 6, among the light sources 110 of the lighting unit 100 provided to generate the radiation area on the corresponding seat S, the light source 110 located at the frontmost position is turned on to emit light toward the forward moved seat S so as to generate the radiation area on the corresponding seat S.

Figure 7:
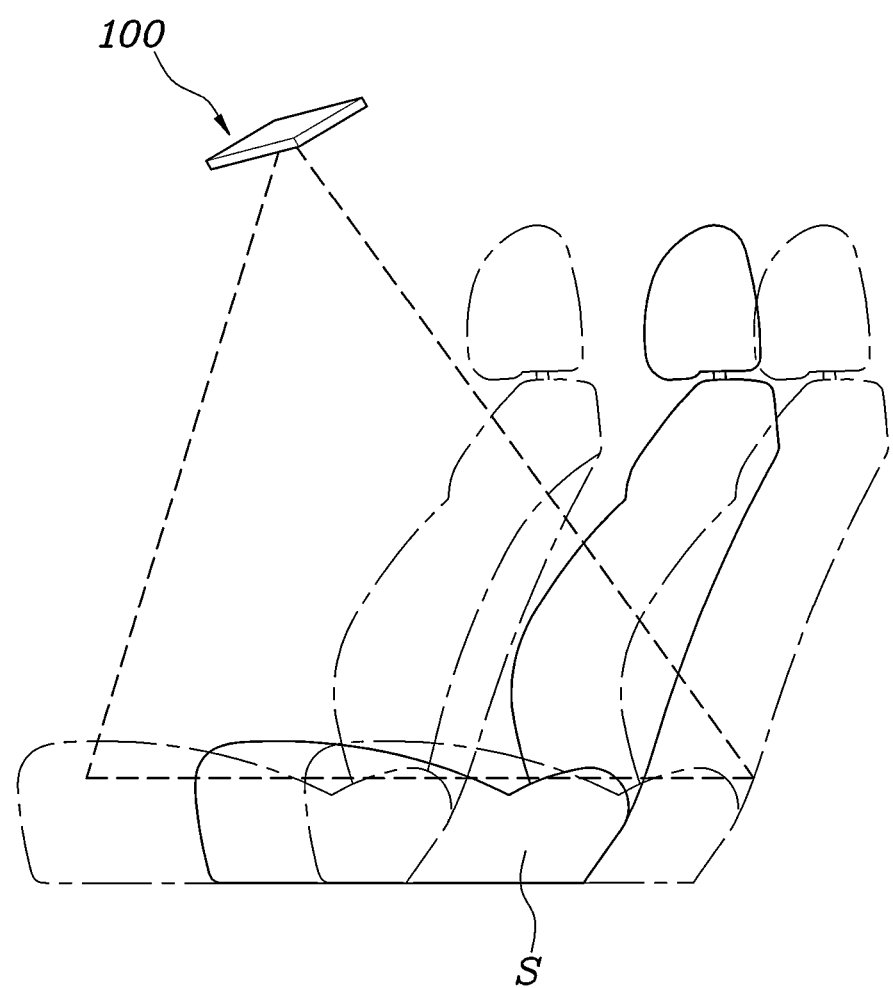
FIG. 7 is a view showing a radiation area in a state in which the seat is moved to the center.

Further, when the seat S in which the passenger sits is moved to the center, as shown in FIG. 7, among the light sources 110 of the lighting unit 100 provided to generate the radiation area on the corresponding seat S, the light source 110 located at the central position is turned on to emit light toward the centrally moved seat S to generate the radiation area on the corresponding seat S.

Figure 8:
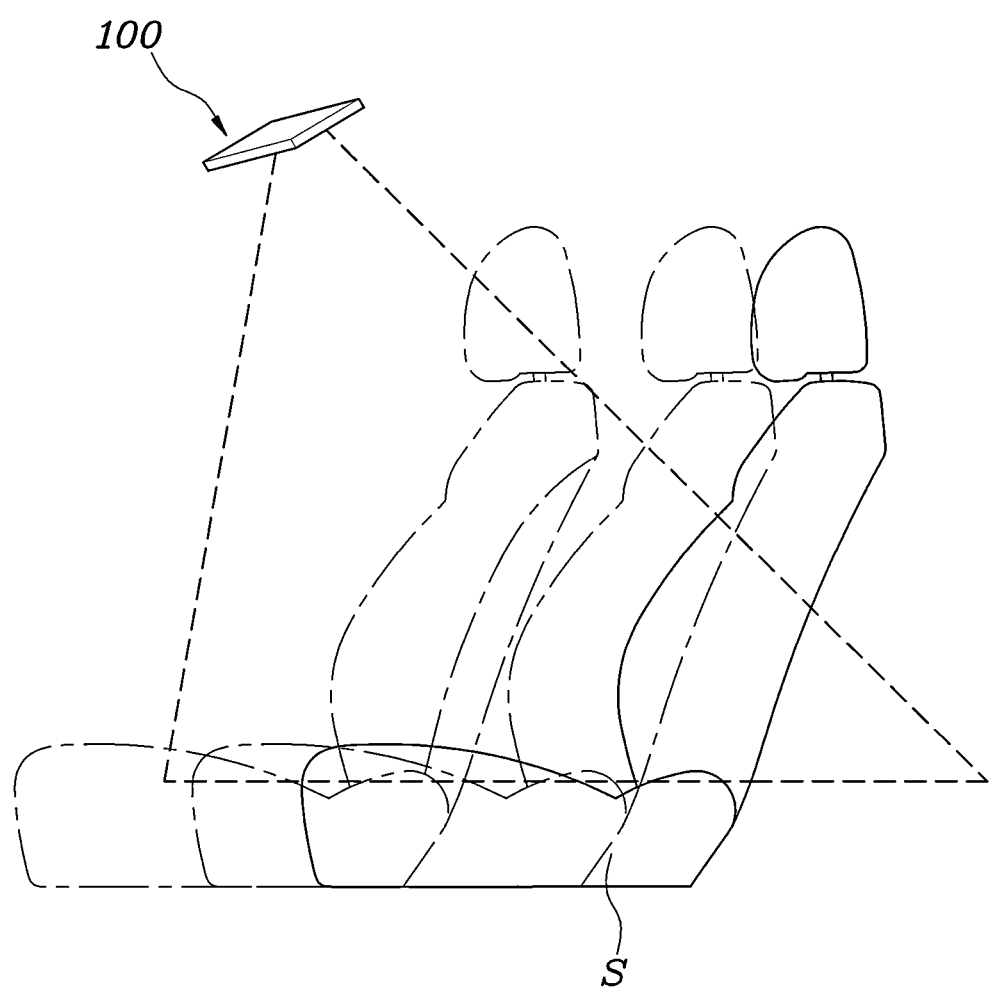
FIG. 8 is a view showing a radiation area in a state in which the seat is moved rearward.

In addition, when the seat S in which the passenger sits is moved rearward, as shown in FIG. 8, among the light sources 110 of the lighting unit 100 provided to generate the radiation area on the corresponding seat S, the light source 110 located at the rearmost position is turned on to emit light toward the rearward moved seat S so as to generate the radiation area on the corresponding seat S.

The above description indicates just one embodiment of the present disclosure in which a lighting unit 100 includes three light sources 110. The number of the light sources 110 and the radiation areas of the light sources 110 may be set differently depending on the moving range of the seat S.

The controller 300 may pre-store the color temperatures of the respective light sources 110 depending on the reclining angle ranges of the seats S. The controller 300 may control the lighting units 100 so as to emit light having the color temperature corresponding to the reclining angle of the seat S, when the reclining angle of the seat S is input through the information collector 200.

In other words, the controller 300 receives the information about the seat S in which a passenger sits and the tilt or recline angle of the seat S changed by a passenger request through the information collector 200. The controller 300 controls the appropriate lighting unit 100 to adjust the color temperature of light emitted toward the corresponding seat S. The controller 300 transmits a control command to the corresponding lighting unit 100 based on a pre-stored database to control the lighting units 100 depending on the reclining angles of the seats S, i.e., the tilt angles of the seat backs of the seats S. Additionally, the corresponding lighting unit 100 adjusts the color temperature of light emitted by the respective light sources 110 based on the received control command.

In more detail, the controller 300 controls the corresponding lighting unit 100 to decrease the color temperature of light so as to emit a warm-toned light, when the reclining angle of the seat S is increased or more reclined. The controller 300 also controls the corresponding lighting unit 100 to increase the color temperature of light so as to emit a cool-toned light, when the reclining angle of the seat S is decreased or more upright.

Figure 9:
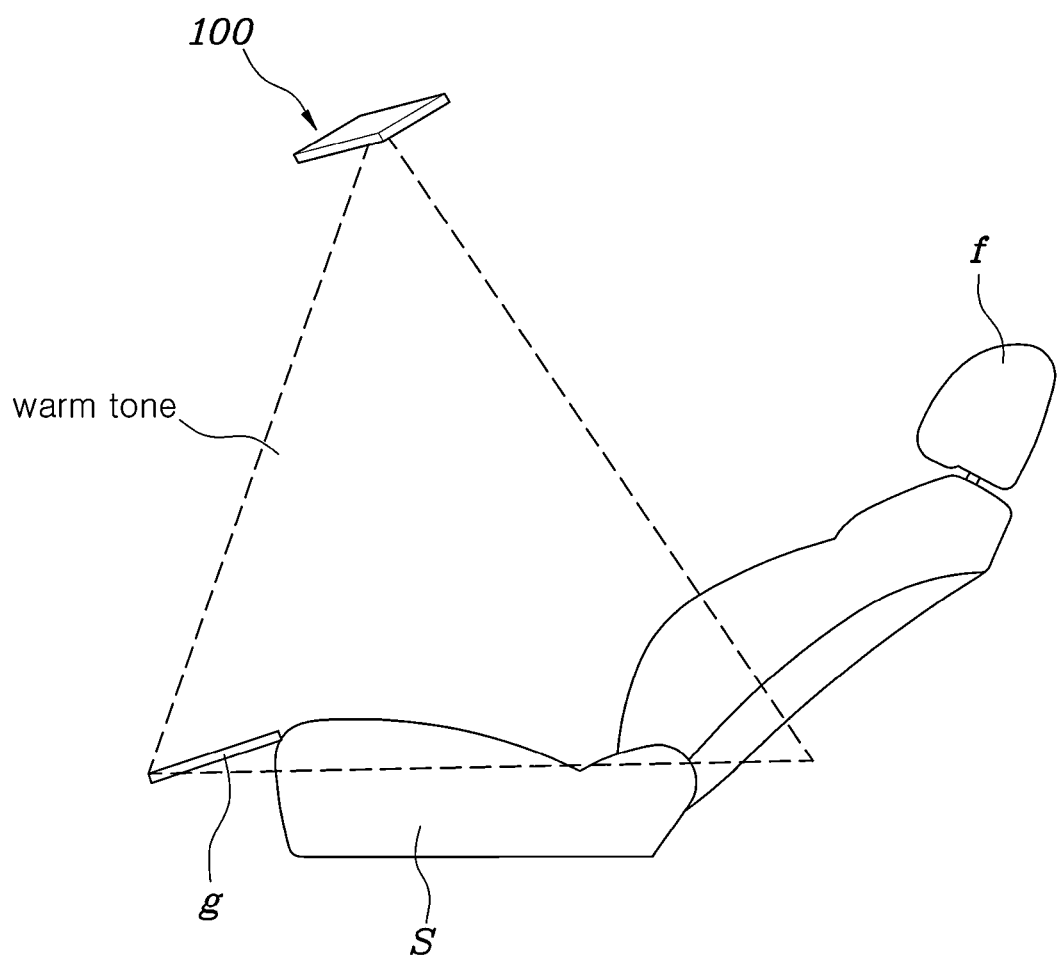
FIG. 9 is a view showing a color temperature in a state in which the reclining angle of the seat is increased.

An increase in the reclining angle of the seat S indicates that the posture of the passenger is changed toward a lying posture. As a result, the controller 300 controls the corresponding lighting unit 100 to decrease the color temperature of the emitted light. For example, when the reclining angle of the seat S is equal to or more than 120°, as shown in FIG. 9, the controller 300 may control the lighting unit 100 to emit warm-toned light of 3,500 K or lower through the light sources 110. Therefore, when the posture of the passenger is changed to the lying posture, the warm-toned light emitted by the lighting unit 100 may provide an anti-glare effect or a reduced light condition to the passenger. This may be optimized for the state of the passenger in the lying posture and the purpose of the lying posture of the passenger, thereby being capable of providing stability to the passenger.

Figure 10:
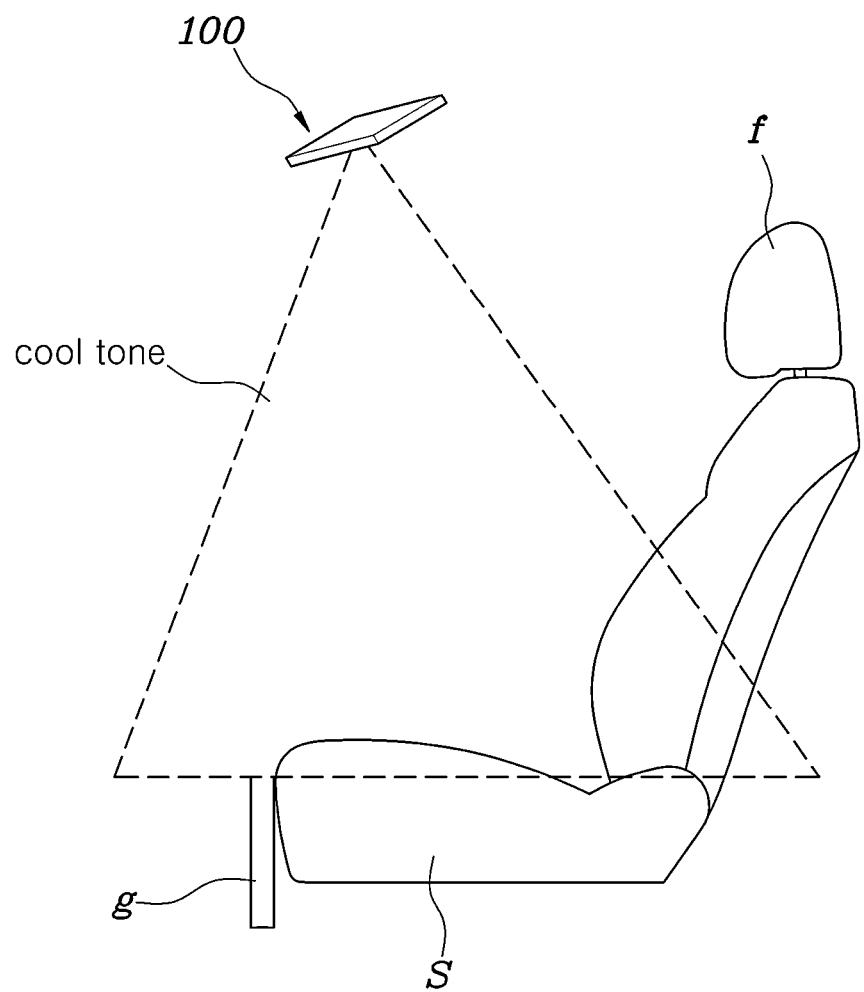
FIG. 10 is a view showing a color temperature in a state in which the reclining angle of the seat is decreased.
Figure 11:
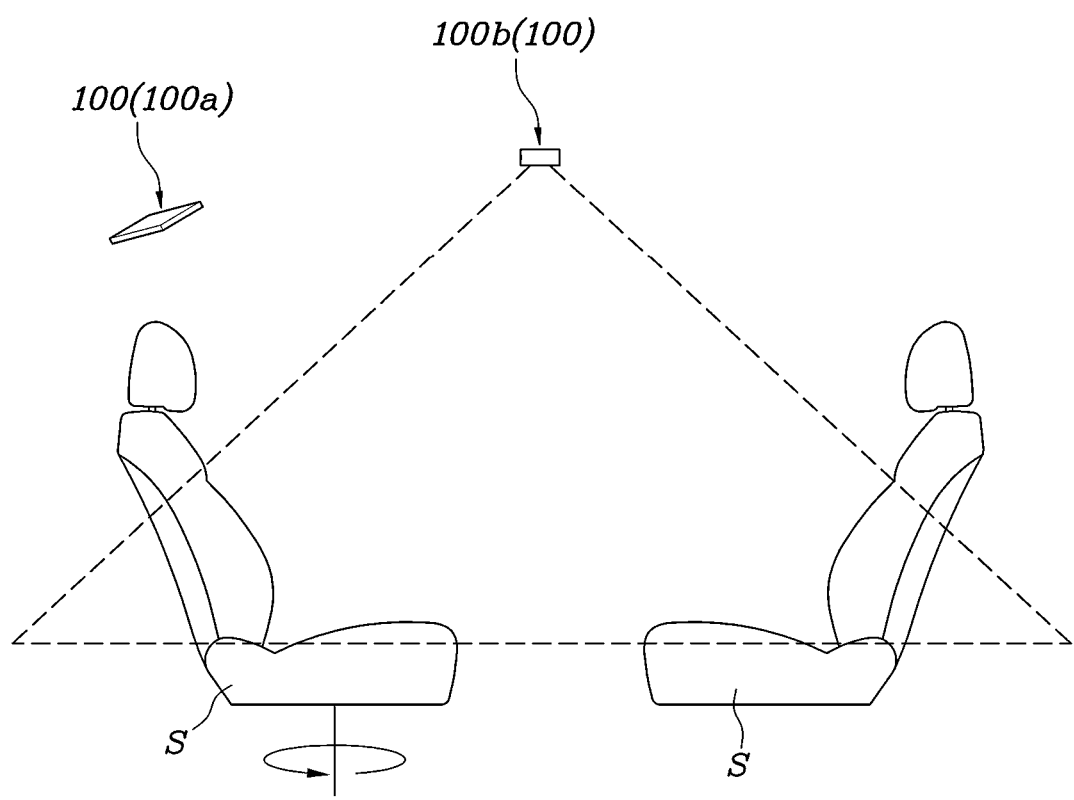
FIG. 11 is a view showing a radiation area in a state in which a front row seat is swiveled.

A decrease in the reclining angle of the seat S indicates that the posture of the passenger is changed to a sitting posture. As a result, the controller 300 controls the lighting unit 100 to increase the color temperature of light. For example, when the reclining angle of the seat S is equal to or less than 104°, as shown in FIG. 10, the controller 300 may control the lighting unit 100 to emit cool-toned light of 5,500 K or higher through the light sources 110. Therefore, when the posture of the passenger is changed to the sitting posture, the cool-toned light emitted by the lighting unit 100 may improve visibility, allowing the passenger to perform a particular action in the sitting posture.

In addition, when the reclining angle of the seat S is input through the information collector 200, the controller 300 controls the lighting unit 100 to gradually decrease the brightness of light when the reclining angle of the seat S is increased. The controller 300 controls the lighting unit 100 to gradually increase the brightness of light when the reclining angle of the seat S is decreased.

As such, when the posture of the passenger is changed to the lying posture as the reclining angle of the seat S is increased, the controller 300 controls the corresponding lighting unit 100 to decrease the brightness of light so as to provide an anti-glare effect or a reduced light condition to the passenger. In other words, because the field of view of the passenger is upwards in the lying posture, potential glare and the possibility of the passenger being in a deep sleep in the lying posture necessitate a reduction in the brightness of light emitted by the lighting unit 100.

Further, when the posture of the passenger is changed to the sitting posture as the reclining angle of the seat S is decreased, the controller 300 controls the corresponding lighting unit 100 to increase the brightness of light so as to secure passenger visibility. In other words, because the passenger may perform a particular action in the sitting posture, the brightness of light emitted by the lighting unit 100 is increased to secure passenger visibility.

The color temperature and brightness of light depending on the reclining angle of the seat S may be automatically determined under the control of the controller 300. Additionally, when the passenger presets the operation of the lighting unit 100 or directly inputs a command, the lighting unit 100 may be controlled such that the color temperature and brightness of light are determined by giving first priority to the passenger's command.

In the case that the seats S are configured to be swiveled, some of the lighting units 100 may further include a swiveling light source 110*a* configured to generate a radiation area on the swiveled seat S.

In other words, when the seat S is swiveled, the position of the passenger in the seat S is changed as the seat S is rotated at 180°. Further, when the seat S is swiveled, not only the position of the passenger but also the direction the passenger is facing is changed.

Therefore, it is advantageous to set the radiation area so as to suit the changed position and direction of the passenger. Therefore, some of the plurality of lighting units 100 may further include the swiveling light source 110*a* configured to generate the radiation area on the swiveled lighting unit 100. As a result, the passenger may be located in the radiation area even when the seat S is swiveled.

In more detail, the plurality of lighting units 100 may be provided, and the lighting units 100 having the radiation areas on some back seats S other than the frontmost seats S may further include the swiveling light source 110*a*.

In the present disclosure, the plurality of lighting units 100 may be provided to correspond to the respective seats S. The lighting units 100 other than the lighting units 100 corresponding to the frontmost seats S may further include the swiveling light source 110*a*.

Figure 4:
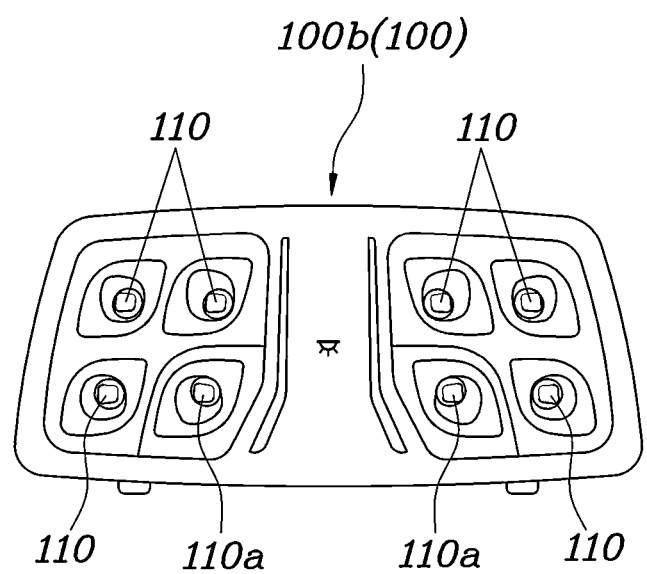
FIG. 4 is a view showing a second row central lighting unit among lighting units according to one embodiment of the present disclosure.
Figure 5:
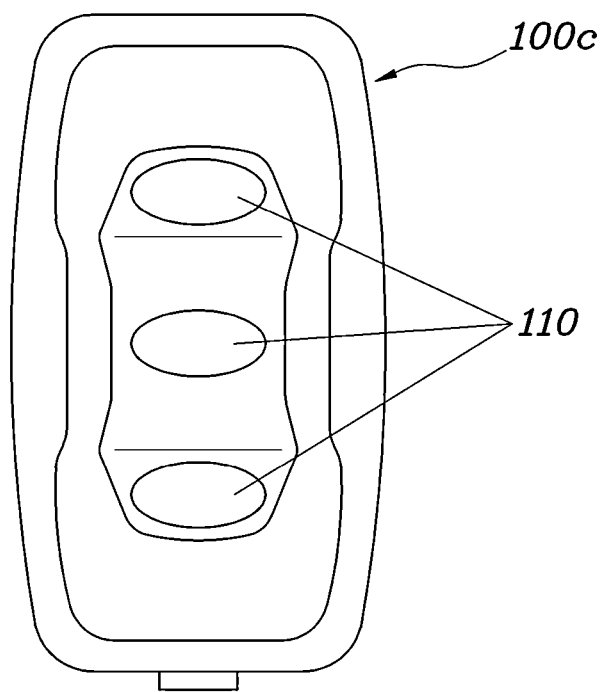
FIG. 5 is a view showing a subsidiary lighting unit among lighting units according to one embodiment of the present disclosure.

For example, when a front row seat S is swiveled, a passenger sitting in the front row seat S deviates from the radiation area of the lighting unit 100 corresponding to the front row seat S. Therefore, the lighting unit 100 corresponding to a rear row seat S further includes the swiveling light source 110*a*. As a result, both the passenger sitting in the swiveled front row seat S and a passenger sitting in the rear row seat S may be located in a radiation area of light emitted by the lighting unit 100 corresponding to the rear row seat S. In other words, as shown in FIG. 4, the second row central lighting unit 100*b* may further include the swiveling lighting unit 110*a* and may provide light even to a passenger sitting in a swiveled seat S through the swiveling light source 110*a*.

Thereby, the information collector 200 collects information about the swiveled angles of the seats S. The controller 300 may then control the swiveling light source 110*a* configured to generate the radiation area corresponding to the swiveled position of the seat S in which the passenger sits, when information indicating that the position of the seat S in which the passenger sits is swiveled is input through the information collector 200.

In other words, the controller 300 receives the information about the seat S in which the passenger sits and the swiveled angle of the seat S in which the passenger sits through the information collector 200. The controller 300 also controls the corresponding lighting unit 100 to generate light to the radiation area on the swiveled seat S. The controller 300 transmits a control command to the respective light sources of the corresponding lighting unit 100 based on a pre-stored database to control the lighting units 100 depending on the swiveled angles of the seats S. The corresponding lighting unit 100 emits light by turning on the swiveling light source 110*a* based on the received control command.

Further, the information collector 200 collects information pertaining to any instances of failure that may occur during the swiveling the seats S. The controller 300 controls the lighting units 100 to emit light so that the seat S in which a failure occurs is included in the radiation area of the corresponding lighting unit 100, when information about the seat S in which the failure occurs is input through the information collector 200.

The occurrence of failure when swiveling a seat S includes a situation in which the seat S is not capable of being operated due to an obstacle existing in a rotation area required to swivel the seat S. The information collector 200 may detect the obstacle through the camera sensor a or may determine whether or not failure in the swiveling operation of the seat S occurs through the amount of current applied to a motor when the seat S is swiveled.

The controller 300 controls the lighting units 100 to emit light toward the seat S in which the failure occurs, when information about the seat S in which the failure occurs is input through the information collector 200. The controller 300 may control the respective light sources of the lighting unit 100 corresponding to the seat S in which the failure occurs to flicker or to be sequentially turned on so that the passenger may recognize the seat S in which the failure occurs. When the radiation area is generated by emitting light from the lighting unit 100 toward the seat S in which the failure occurs, the passenger in the vehicle may recognize the seat S in which the failure occurs. As a result, the passenger may remove an obstacle causing the failure in the swiveling operation of the seat S, and the swiveling operation of the seat S may be normalized.

In addition, the controller 300 may control the respective light sources 110 of the lighting unit 100 corresponding to the swiveled seat S to be sequentially turned on in a direction of swiveling the seat S.

As such, when the seat S is swiveled, the controller 30 may sequentially turn on the respective light sources 110 of the lighting unit 100 corresponding to the swiveled seat S. As a result, the passenger in the vehicle is able to recognize the swiveling operation of the seat S, giving a sense of luxuriousness to the swiveling operation of the seat S. For example, when the seat S is swiveled in the clockwise direction, the respective light sources 110 of the lighting unit 100 corresponding to the swiveled seat S may be sequentially turned on in the rearward direction from the frontmost light source 110. Additionally, when the seat S is swiveled in the counterclockwise direction, the respective light sources 110 of the lighting unit 100 corresponding to the swiveled seat S may be sequentially turned on in the forward direction from the rearmost light source 110.

Thereby, the passenger may recognize the swiveling operation of the seat S. The controller 300 may stop the sequential turning-on of the light sources 110 and may control the respective lighting units 100 depending on the positions of the seat S, after completion of swiveling of the seat S.

Further, in the present disclosure, light emission from the lighting units 100 in the interior of the vehicle may be controlled depending on the position of a passenger outside the vehicle.

Figure 12:
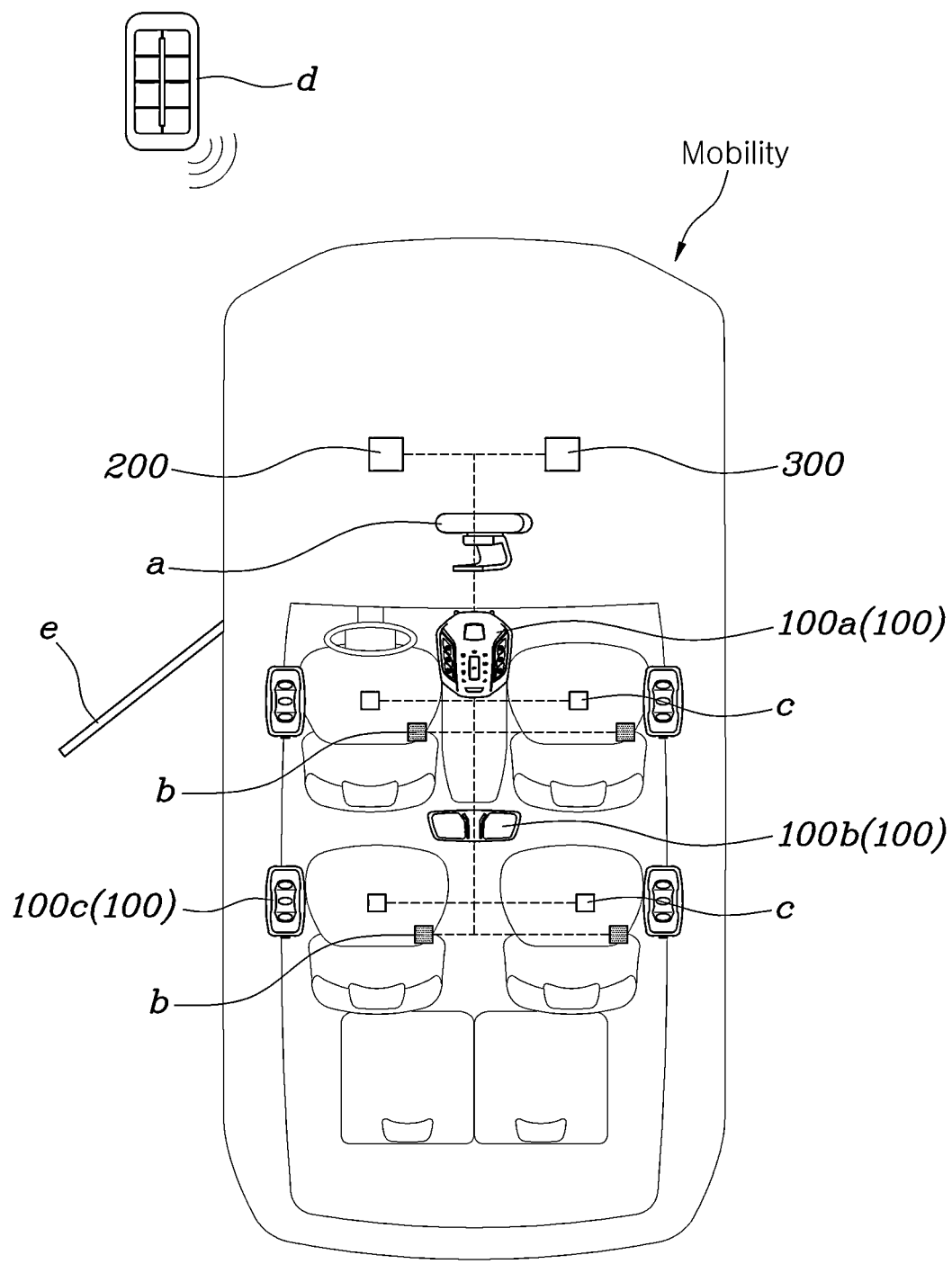
FIG. 12 is a view illustrating operation of lighting units depending on a position of a passenger outside the vehicle.

In detail, as shown in FIG. 12, the information collector 200 may further confirm the position information of the passenger outside the vehicle. The controller 300 may implement mood lighting through some of the plurality of light sources 110 of the lighting units 100, when information indicating that the passenger is sensed within a designated distance from the vehicle is input through the information collector 200.

The information collector 200 may detect distance information between the vehicle and the passenger through a mobile phone or a smart key d possessed by the passenger. The controller 300 turns on the plurality of light sources 110 of the lighting units 100, when it is determined that a distance between the vehicle and the passenger is within a pre-stored distance. The pre-stored distance between the vehicle and the passenger may be set to a distance at which the passenger outside the vehicle may recognize the turning-on of the light sources 110. Further, the lighting units 100 may include a light source 110 configured to implement mood lighting, or some of the light sources 110 may be turned on based on the type of mood lighting.

Thereby, the passenger outside the vehicle may recognize the turning-on of the lighting units 100 and may easily find the position of the vehicle. As a result, passenger convenience and usability may be improved.

Furthermore, the information collector 200 may confirm information about the opening and closing of the doors of the vehicle. The controller 300 may turn on the respective light sources 110 of the lighting units 100 in a predetermined welcome mode, when information indicating that a door e is opened is input through the information collector 200.

The information collector may confirm whether or not the doors e are opened and/or closed through sensors provided on the doors e.

The controller 300 performs the welcome mode when information indicating that a door e is opened is input through the information collector 200. The welcome mode is a mode in which the respective light sources 110 of the lighting units 100 are turned on in a predetermined pattern and may be changed depending on a passenger request.

Further, the controller 300 may set the welcome mode to be performed in a start-off state. The light sources 110 of the respective lighting units 100 may be turned on in the welcome mode when the door e is opened in the start-off state. As a result, the lighting units 100 may provide a sense of luxury in the interior of the vehicle to the passenger.

Moreover, in the present disclosure, the radiation areas by the lighting units 100 may be adjusted depending on the eye position of the passenger.

In detail, the information collector 200 may further confirm eye position information of the passenger sitting on the seat S. The controller 300 may control the respective light sources 110 of the lighting units 100 so that the passenger's eyes are not included in the radiation area of the corresponding lighting unit 100.

The information collector 200 may detect the eye position of the passenger through the camera sensor a provided in the interior of the vehicle.

The controller 300 receives the eye position information of the passenger through the information collector 200. The controller 300 controls the lighting units 100 so that the passenger's eyes are not included in the radiation area of the corresponding lighting unit 100. In other words, when the passenger's eyes are included in the radiation area of the corresponding lighting unit 100, the passenger may experience glare, and the driving stability of the vehicle may be deteriorated.

Therefore, the controller 300 controls the respective lighting units 100 depending on the eye position of the passenger so that the passenger's eyes are not included in the radiation area generated by the light sources 110. In other words, although the eye position of the passenger is changed due to movement of the position of the seat S in which the passenger sits or reclining of the seat S, the respective lighting units 100 are adjusted so that the passenger's eyes are not included in the radiation area by the corresponding lighting unit 100 to avoid any glare.

Further, the controller 300 may receive the eye position information of a driver sitting in the driver's seat S among the seats S. The controller 300 may control the respective light sources 110 of the lighting unit 100 corresponding to the driver's seat S so that the driver's eyes are included in the radiation area of the corresponding lighting unit 100, when the drowsy state of the driver is confirmed based on the eye position information of the driver.

The controller 300 controls the lighting units 100 to increase the color temperature of light emitted by the lighting units 100 so as to emit cool-toned light.

The information collector 200 detects the eye position of the driver sitting in the driver's seat S and confirms whether or not the driver is in the drowsy state. Determining whether the driver is in a drowsy state is achieved by detecting the pupil size and eye closing amount of the driver based on the eye position information of the driver.

When it is confirmed that the driver is in the drowsy state through the information collector 200, the controller 300 controls the lighting units 100 so that the driver's eyes are included in the radiation area of the corresponding lighting unit 100. In addition, the controller 300 may control the lighting units 100 to increase the color temperature of light emitted by the light sources 110 of the corresponding lighting unit 100 so as to emit cool-toned light. Further, the controller 300 may control the lighting units 100 so that not only the lighting unit 100 corresponding to the driver's seat but also other lighting units 100 emit light.

Thereby, the driver escapes from the drowsy state and keeps his/her eyes forward. Thus, the driving stability of the vehicle may be secured.

Further, the information collector 200 may confirm information about the headrests f of the seats S, and the controller 300 may confirm again the eye position information of the passenger and then control the lighting units 100 so that the passenger's eyes are not included in the radiation area of the corresponding lighting unit 100, when information indicating that the position of the headrest f of one seat S is changed is input.

The information collector 200 detects the position of the headrest f through the driving amount and driving direction of a motor configured to change the position of the headrest f.

When information indicating that the position of the headrest f of one seat S is changed is input to the controller 300 through the information collector 200, the controller 300 determines that the eye position of the passenger is changed, and thus receives again the eye position information of the passenger.

Thereafter, when the passenger's eyes are included in the radiation area of the corresponding lighting unit 100 due to change in the position of the headrest f, the controller 300 controls the lighting units 100 so that the passenger's eyes are not included in the radiation area of the corresponding lighting unit 100, so as to prevent the glare of the passenger.

Further, the information collector 200 may confirm information about leg rests g of the seats S, and the controller 300 may control the lighting units 100 to decrease the color temperature of light so as to emit warm-toned light and to decrease the brightness of the light, when the leg rest g of the seat S is unfolded.

The information collector 200 detects the position of the leg rest g through the driving amount and driving direction of a motor configured to change the position of the leg rest g.

When unfolding of the leg rest g is confirmed through the information collector 200, the controller 300 determines that the passenger is changed to a comfortable posture and controls the lighting units 100 to decrease the color temperature of light so as to emit warm-toned light and to decrease the brightness of the light, thereby preventing the glare of the passenger.

Figure 13:
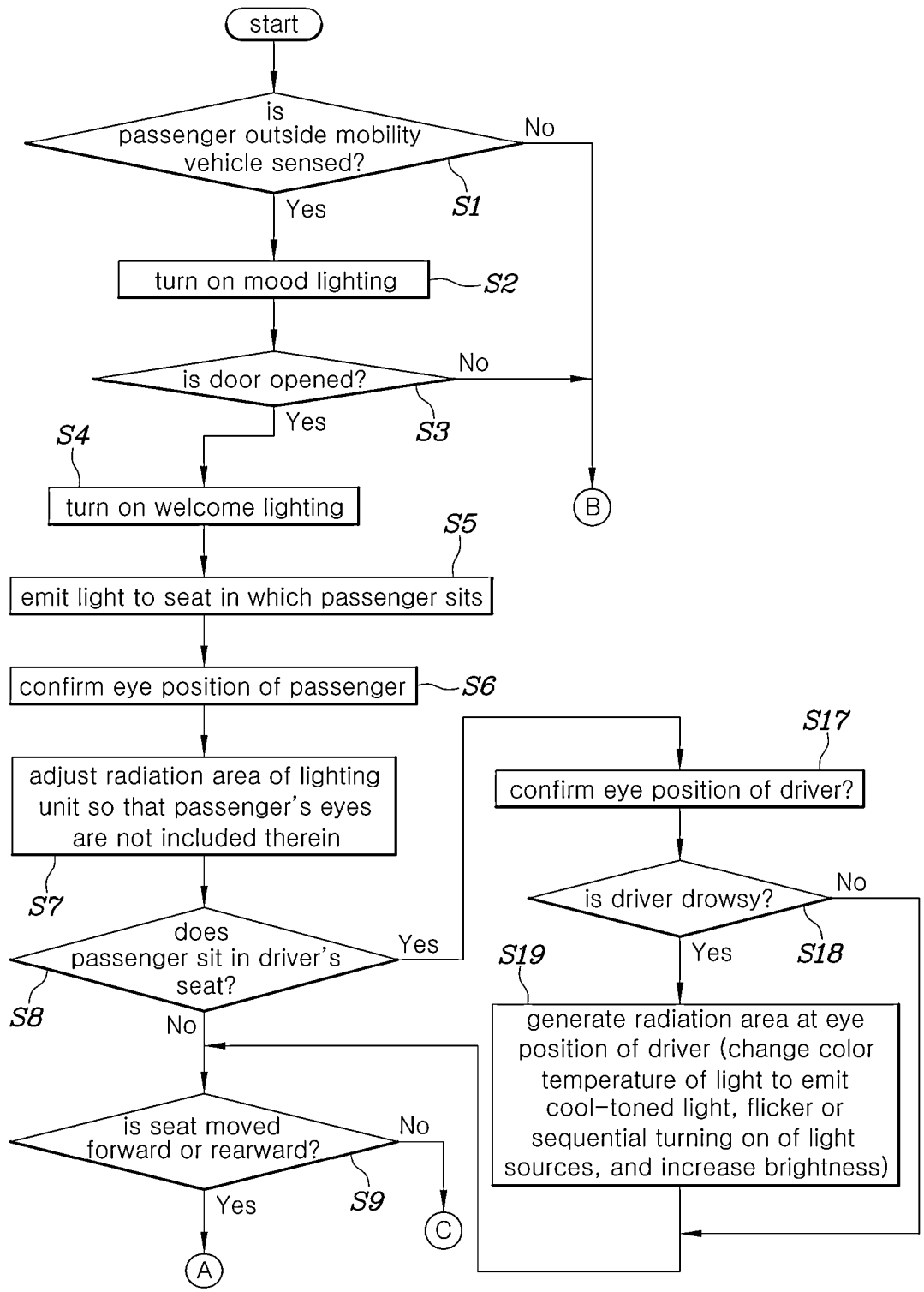
FIGS. 13 and 14 are flowcharts representing a process of operating a vehicle interior lighting system according to the present disclosure.
Figure 14:
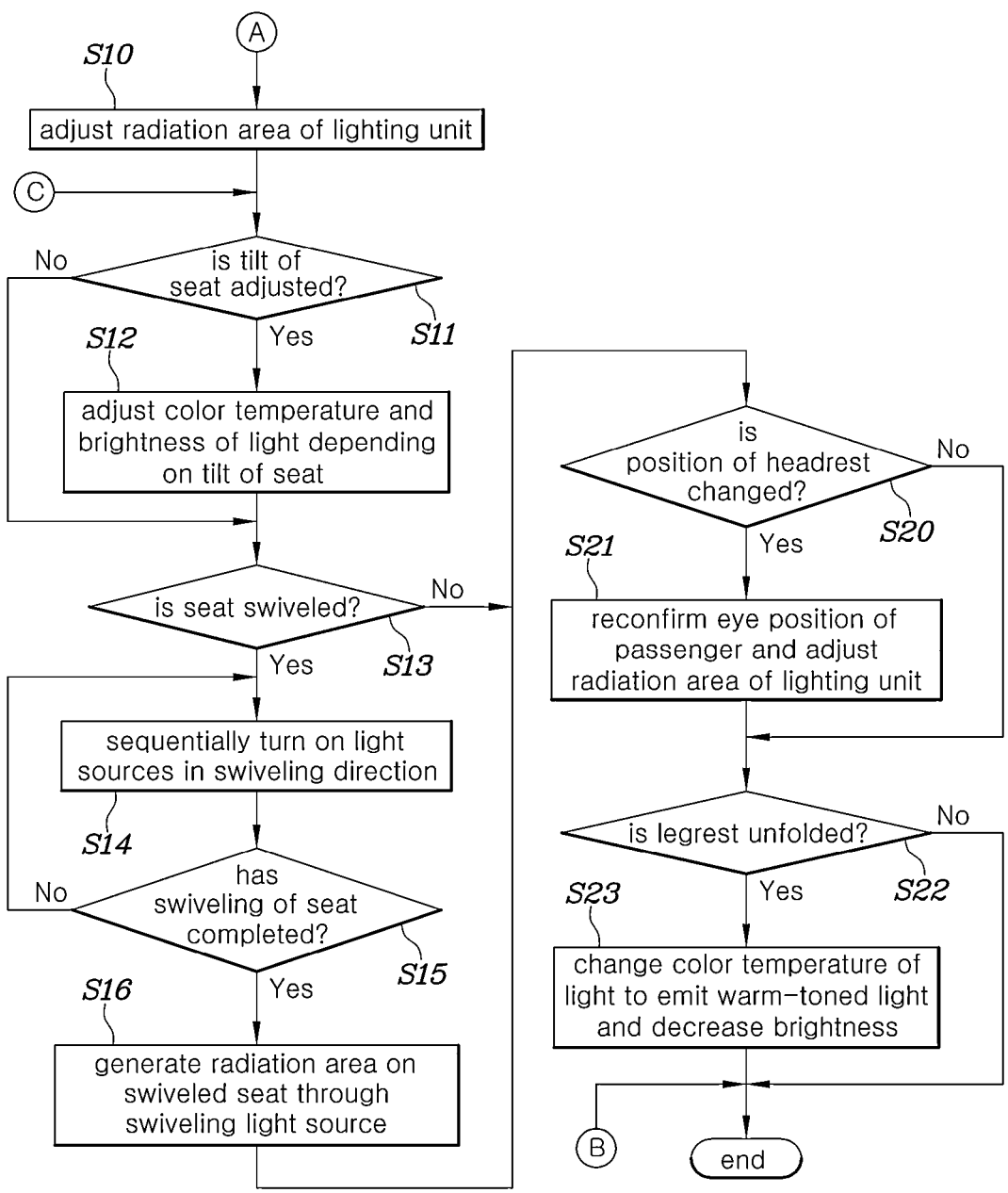

The above-described interior lighting system according to the present disclosure may be controlled in order of S1-S23 shown in FIGS. 13 and 14.

The interior lighting system having the above-described structure provides light to a passenger in the interior of a vehicle, and adjusts the radiation area, brightness and color temperature of light depending on the behavior, state, and posture of the passenger, so as to improve passenger convenience and upgrade interior lighting.

As is apparent from the above description, an interior lighting system having the above-described structure according to the present disclosure provides light to a passenger in the interior of a vehicle, and adjusts the radiation area, brightness and color temperature of light depending on the behavior, state and posture of the passenger. The interior lighting system is thereby capable of improving passenger convenience and upgrading interior lighting.

Further, the interior lighting system adjusts the radiation area, brightness and color temperature of light depending on the state of a driver. Accidents may thus be prevented, leading to safe driving and reducing the rate of traffic accidents and the associated social costs.

Although the embodiments of the present disclosure have been disclosed for illustrative purposes, those having ordinary skill in the art should appreciate that various modifications, additions, and substitutions are possible, without departing from the scope and spirit of the inventive concept as disclosed in the accompanying claims.

What is claimed is:

1. An interior lighting system for a vehicle, the system comprising:
    a lighting unit including a plurality of light sources having differently set radiation areas and configured such that a brightness and a color temperature of light emitted by each of the light sources is adjustable to implement a dimming function;
    an information collector configured to confirm state information of the vehicle and to confirm passenger information including a position and a posture of a passenger in the vehicle; and
    a controller configured to control the lighting unit to adjust the brightness of light emitted thereby so as to emit the light to the position of the passenger when information about the position of the passenger is input through the information collector, and to adjust the color temperature of the light emitted by the corresponding lighting unit when information about the posture of the passenger is input through the information collector,
    wherein the information collector is further configured to confirm information about a leg rest of a seat of the vehicle; and
    wherein the controller is configured to control the lighting unit to decrease the color temperature of light emitted by the lighting unit so as to emit warm-toned light and to decrease the brightness of the light, when the leg rest of the seat in which the passenger sits is unfolded.

2. The system according to claim 1, wherein the lighting unit comprises a plurality of the lighting units in an interior of the vehicle so as to set the radiation areas on respective seats.

3. The system according to claim 1, wherein the information collector is configured to collect information about whether or not a passenger sits in seats of the vehicle, positions of the seats, and reclining angles of the seats.

4. The system according to claim 3, wherein, when information indicating that a position of one of the seats in which a passenger sits is adjusted in a forward or a rearward direction is input through the information collector, the controller is configured to control the lighting unit to emit light through the light sources having a radiation area corresponding to the adjusted position of the seat in which the passenger sits.

5. The system according to claim 3, wherein the controller is configured to pre-store the color temperatures of the respective light sources depending on the reclining angle ranges of the seats, and to control the lighting unit so as to emit light having the color temperature corresponding to a reclining angle of one of the seats in which the passenger sits, when the reclining angle of the seat in which the passenger sits is input through the information collector.

6. The system according to claim 5, wherein the controller is configured to control the lighting unit to decrease the color temperature of light so as to emit warm-toned light, when the reclining angle of the seat is increased, and control the lighting unit to increase the color temperature of light so as to emit cool-toned light, when the reclining angle of the seat is decreased.

7. The system according to claim 3, wherein, when an reclining angle of one of the seats in which a passenger sits is input through the information collector, the controller is configured to control the lighting unit to gradually decrease the brightness of light when the reclining angle of the seat in which the passenger sits is increased, and to control the lighting unit to gradually increase the brightness of light when the reclining angle of the seat in which the passenger sits is decreased.

8. The system according to claim 3, wherein, for a seat configured to be swiveled, the lighting unit further comprises a swiveling light source configured to generate a radiation area on the seat configured to be swiveled.

9. The system according to claim 8, wherein:
the information collector is configured to collect information about swivel angles of the seat configured to be swiveled; and
the controller is configured to control the swiveling light source configured to generate the radiation area corresponding to a swiveled position of the seat configured to be swiveled, when information indicating that the position of the seat configured to be swiveled is swiveled is input through the information collector.

10. The system according to claim 8, wherein:
the information collector is configured to collect information about an occurrence of a failure when the back seats are swiveled; and
the controller is configured to control the plurality of the lighting units to emit light so that a seat in which the failure occurs is included in the radiation area of a corresponding lighting unit of the plurality of the lighting units, when information about the seat in which the failure occurs is input through the information collector.

11. The system according to claim 8, wherein the controller is configured to control the respective light sources of a corresponding lighting unit of the plurality of the lighting units to be sequentially turned on in a direction of swiveling the seat.

12. The system according to claim 1, wherein:
the information collector is further configured to confirm position information of the passenger outside the vehicle; and
the controller is configured to implement mood lighting through some of the plurality of light sources of the lighting unit, when information indicating that the passenger is sensed within a designated distance from the vehicle is input through the information collector.

13. The system according to claim 1, wherein:
the information collector is further configured to confirm information about opening and closing of doors; and
the controller is configured to turn on the respective light sources of the lighting unit in a predetermined welcome mode, when information indicating that a door is opened is input through the information collector.

14. The system according to claim 1, wherein:
the information collector is further configured to confirm eye position information of the passenger sitting in a seat of the vehicle; and
the controller is configured to control the respective light sources of the lighting unit so that passenger's eyes are not included in the radiation area of the lighting unit corresponding to the seat in which the passenger sits.

15. The system according to claim 14, wherein the controller is configured to receive eye position information of a driver sitting in the seat, and to control the respective light sources of the lighting unit so that the driver's eyes are included in the radiation area of the lighting unit corresponding to the seat, when a drowsy state of the driver is confirmed based on the eye position information of the driver.

16. The system according to claim 15, wherein the controller is configured to control the lighting unit to increase the color temperature of light emitted by the lighting unit corresponding to the seat so as to emit cool-toned light, when the drowsy state of the driver is confirmed.

17. The system according to claim 14, wherein:
the information collector is further configured to confirm information about a headrest of the seat; and
the controller is configured to confirm again the eye position information of the passenger and then control the lighting unit so that the passenger's eyes are not included in the radiation area of the lighting unit corresponding to the seat in which the passenger sits, when information indicating that a position of the headrest of the seat in which the passenger sits is changed is input.

18. An interior lighting system for a vehicle, the system comprising:
a lighting unit including a plurality of light sources having differently set radiation areas and configured such that a brightness and a color temperature of light emitted by each of the light sources is adjustable to implement a dimming function;
an information collector configured to confirm state information of the vehicle and to confirm passenger information including a position and a posture of a passenger in the vehicle; and
a controller configured to control the lighting unit to adjust the brightness of light emitted thereby so as to emit the light to the position of the passenger when information about the position of the passenger is input through the information collector, and to adjust the color temperature of the light emitted by the corresponding lighting unit when information about the posture of the passenger is input through the information collector,
wherein, for a seat configured to be swiveled, the lighting unit further includes a swiveling light source configured to generate a radiation area on the seat configured to be swiveled,
wherein the lighting unit includes a plurality of the lighting units, and
wherein the plurality of the lighting units includes the radiation areas on at least some back seats of the vehicle, including the seat configured to be swiveled, and further includes the swiveling light source.

19. An interior lighting system for a vehicle, the system comprising:
a lighting unit including a plurality of light sources having differently set radiation areas and configured such that a brightness and a color temperature of light emitted by each of the light sources is adjustable to implement a dimming function;
an information collector configured to confirm state information of the vehicle and to confirm passenger information including a position and a posture of a passenger in the vehicle; and
a controller configured to control the lighting unit to adjust the brightness of light emitted thereby so as to emit the light to the position of the passenger when information about the position of the passenger is input through the information collector, and to adjust the color temperature of the light emitted by the corresponding lighting unit when information about the posture of the passenger is input through the information collector,
wherein the information collector is further configured to confirm eye position information of the passenger sitting in a seat of the vehicle, wherein the controller is configured to control the respective light sources of the lighting unit so that passenger's eyes are not included in the radiation area of the lighting unit corresponding to the seat in which the passenger sits, and wherein the controller is configured to receive eye position information of a driver sitting in the seat, and to control the respective light sources of the lighting unit so that the driver's eyes are included in the radiation area of the lighting unit corresponding to the seat, when a drowsy state of the driver is confirmed based on the eye position information of the driver.

* * * * *